G. Davis,

Rotary Steam Valve.

No. 3,152. Reissued Oct. 6, 1868.

Witnesses.
Thomas D. Davis
Charles H. Davis

Inventor.
Guy Davis

United States Patent Office.

GUY DAVIS, OF SYRACUSE, NEW YORK.

*Letters Patent No.* 45,910, *dated January* 17, 1865; *reissue No.* 3,152, *dated October* 6, 1868.

IMPROVEMENT IN OSCILLATING-VALVES.

The Schedule referred to in these Letters Patent and making part of the same.

TO ALL WHOM IT MAY CONCERN:

Be it it known that I, GUY DAVIS, of Syracuse, in the county of Onondaga, and State of New-York, have invented a new and improved Steam-Valve; and I do hereby declare that the following is a full and exact description thereof, reference being had to the accompanying drawings, and to the letters of reference marked thereon, in which—

Figure 5:
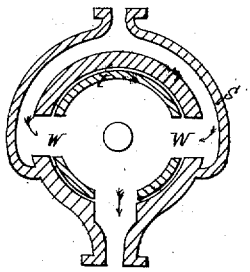
Figure 6:
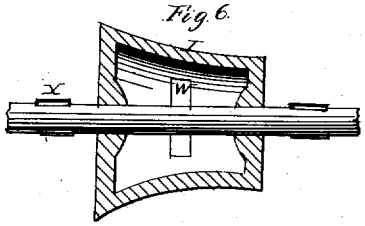
Figure 7:
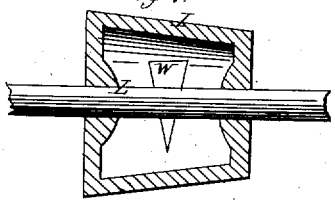

Figures 5, 6, and 7 are longitudinal and transverse sectional views of the valve, as arranged for a governor-valve.

This invention relates to valves for steam-engines, and it consists in an oscillating valve, suspended upon adjustable bearings, by means of which it is made adjustable with reference to its seat, so that, as it wears, it may be tightened thereon, without being removed from said seat; and it further consists in the construction of the valve-seat, and in the arrangement of a steam-jacket for the same, and in the combination and arrangement of the steam-passages, as will be fully described hereafter.

To enable others skilled in the art to make and use my invention, I will proceed to describe its construction and operation.

I construct my valve of any suitable metal, or combination of metals, of sufficient strength and hardness, best adapted for equalizing the expansion caused by the heat of the steam, and attach it to the centre or at the ends of the steam or working-cylinder, in any position most desirable.

The valve is given an oscillating motion by means of an eccentric and rod, attached to an arm secured to the shaft of the valve, thereby admitting and discharging the steam alternately to and from each end of the cylinder.

Figure 1:
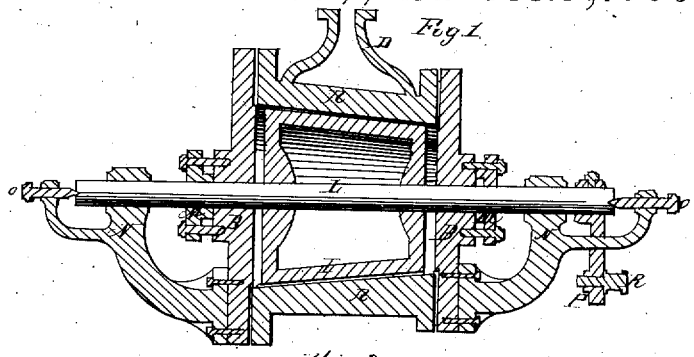
Figures 1 and 2 are longitudinal sectional views of the chest and valve complete, as arranged for an induction and eduction-valve, showing the manner of operating and adjusting the valve.

In fig. 1, A is the chest, the interior of which is bored out true and smooth, and is larger at one end than the other, or more or less conical, as desired.

Figure 2:
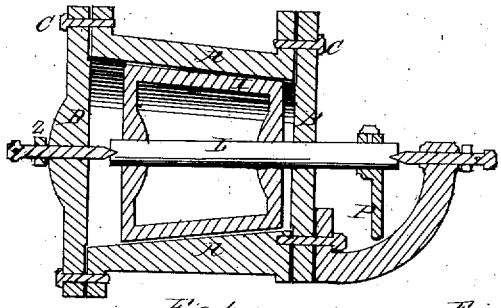
Figure 3:
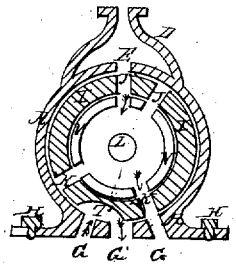
Figures 3 and 4 are transverse sectional views of the same, showing the steam-passages and openings through the chest and valve, and the manner of passing the steam through the same, and the manner of balancing the valve, &c.

I is the valve, which is secured to the shaft L, which may, if desired, pass through stuffing-boxes in the ends of the chest, and be guided by the bearings N, while it is suspended upon and adjusted by the set-screws O O, or the guides V, and stuffing-boxes may be dispensed with, and the valve constructed as shown in fig. 2 of the drawings.

The exterior surface of the valve is turned and accurately fitted to the chest A.

The valve-chest is closed at its ends by the heads B, within which the stuffing-boxes are placed, and through which the shaft L passes.

P is an arm, secured to the shaft L, with a wrist, R, for connecting with the eccentric-rod, and O O are set-screws, for suspending the valve, and adjusting it to its seat.

Z, fig. 2, are jam-nuts, for securing set-screws O O.

D is a steam-chamber, connecting the valve with the boiler.

E is an elongated opening through the shell of the chest, and J J are openings of the same shape through the shell of the valve I.

K K are openings through the opposite side of the valve, connecting the interior of the valve with the working-cylinder of the engine, through the openings G G in the chest, the arrows showing the direction of the steam to the cylinder, and also its discharge from the cylinder through the exhaust-chamber T in the valve and opening G′, in the seat the oscillating motion of the valve connecting the openings J J with the opening E, and the openings K K and G G alternately with each end of the cylinder.

H H are bolts, for securing the chest to the cylinder.

Figure 4:
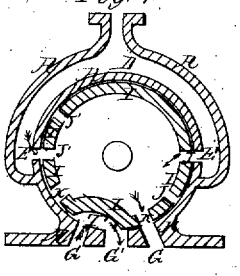

Fig. 4 represents a transverse sectional view of the chest and valve, arranged as an induction and eduction-valve and cut-off.

A is the chest or cylinder, inside of which the valve I works.

A′ is an outside shell, nearly or entirely surrounding and enclosing the shell A, with a steam-space or chamber, D, surrounding the shell A, for the purpose of conducting the steam to the proper inlet-passages, and also for the purpose of keeping the inside shell at the same temperature of the valve, and preventing unequal expansion.

E′ E′ are elongated openings through the sides of the chest, and J′ J′ J′ J′ openings through the sides or shell of the valve.

The openings E′ E′ are one-half the width of the openings K K and G G, and are so arranged that the valve opens both of the openings E′ E′, which are directly opposite each other at exactly the same time, the steam passing into the valve at each side of the chest.

As steam will be admitted through the two openings E′ E′ in one-half of the time that it will be discharged through the single opening G, the two openings E′ E′ are made one-half the width of the opening G G, and the valve is so arranged, by locating the bars I′ I′ I′ I′ I′, that the opening G will be half open before the openings E′ E′ commence to open and admit steam.

The openings G and E′ E′ being all fully open at the same time, by admitting steam at opposite sides of the valve through two openings at the same time it not only nearly balances the pressure of steam on the valve, but admits the steam to the cylinder in one-half the time, and with one-half the movement of the valve, which would be required for a single opening.

The valve may also be set or arranged to open the openings fully, or as little as may be desired, thereby cutting off the steam at any part of the stroke necessary, when it is desired to work the steam expansively.

The exhaust-chamber T connects alternately the steam-openings G G with the exhaust-opening G′, and discharges the steam at the proper time, whether working full-stroke, or cutting off at any point below.

Fig. 5 is a transverse sectional view of my valve, adapted for use as a governor-valve, with steam passing in at opposite sides through the openings W W, and out through the bottom.

Fig. 6 represents a longitudinal sectional view of the valve with a concave exterior.

X X are enlargements of the shaft, to prevent the guide from cutting into the shaft and forming a shoulder, which would prevent the end adjustment of the valve.

W are openings for the admission of steam, which may be of any size and form best adapted for producing the desired result.

This valve may be so nearly balanced as to be very easily controlled by the governor, and will give the engine a steady and uniform speed or motion.

What I claim, and desire to secure by Letters Patent, is—

1. An oscillating-valve, suspended upon adjustable bearings, substantially as shown and described.

2. The steam-chamber D, constructed substantially as shown and described.

3. The arrangement of the steam-passages J, E, K, and G, substantially as shown and described.

4. The arrangement of the exhaust-apparatus T with reference to the apertures G G′, substantially as shown and described.

GUY DAVIS.

Witnesses:

HARRY GIFFORD,
THEODORE D. DAVIS,
CHARLES H. DAVIS.